June 22, 1965 J. STILLWATER 3,191,134

REMOTE CONTROL FOR DIGITALLY TUNED RADIO

Filed Nov. 16, 1961 4 Sheets-Sheet 1

INVENTOR.
JOSEPH STILLWATER
BY
T. L. Styner
ATTORNEY

June 22, 1965 J. STILLWATER 3,191,134

REMOTE CONTROL FOR DIGITALLY TUNED RADIO

Filed Nov. 16, 1961 4 Sheets-Sheet 2

June 22, 1965 J. STILLWATER 3,191,134

REMOTE CONTROL FOR DIGITALLY TUNED RADIO

Filed Nov. 16, 1961 4 Sheets-Sheet 3

United States Patent Office 3,191,134
Patented June 22, 1965

3,191,134

REMOTE CONTROL FOR DIGITALLY TUNED RADIO

Joseph Stillwater, Rochester, N.Y., assignor to General Dynamics Corporation, Rochester, N.Y., a corporation of Delaware Filed Nov. 16, 1961, Ser. No. 152,833
7 Claims. (Cl. 334—21)

This invention relates to tuning mechanisms for resonant circuits and is particularly directed to means for rotating with a common motor a plurality of shafts into selected positions in response to remotely generated command signals.

In the application of R. R. Bettin et al., Serial No. 42,698, filed July 13, 1960, now Patent No. 3,054,057, entitled "Digitally Tuned Transmitter-Receiver" and assigned to the assignees of this application, is disclosed a digital tuning system of resonant circuits. Each resonant circuit, disclosed in detail in said application and depicted in FIG. 1 of this application, comprises an inductance and a system of series and parallel condensers. There are ten condensers in each of several groups of condensers which are so connected that a condenser in any one group will establish the resonant frequency of the circuit to one of ten values in one significant place of a decimal number representing that frequency. A shaft and a detented selecting switch is employed to select one condenser from each group of ten condensers to cause the resonant circuit to be tunable in uniform increments of 1 kc., 10 kc, 100 kc. and 1 megacycle.

The object of this invention is to provide means for remotely positioning each of a plurality of shafts to any one of its ten positions, all the shafts being driven by a single motor.

The object of this invention is attained in a system comprising a resonant tank circuit having a plurality of groups of condensers or other reactive tuning elements and a plurality of switches each driven by a separate shaft for selectively coupling one element of each group into the tank circuit. The reactive elements of each group are chosen in value to produce uniform incremental changes in resonance frequency, the incremental changes produced by the elements of each group being decimally related. A step-by-step tuning shaft is operatively connected to each switch and is rotatable into ten detented positions from 0 to 9. A motor through a gear train continuously drives the idling plate of a magnetic clutch, each idling plate being engageable with a driven plate keyed to the associated tuning shaft. An open-seeking position servo including a manual remote encoding switch and a local slave decoding switch on each shaft provides the information command signals for selectively engaging and disengaging the magnetic clutch to bring each shaft into correct tuning position. As each shaft arrives at its designated position, the open-seeking servo circuit opens to deenergize the coil of the associated magnetic clutch. An OR gate with each of its control circuits connected, respectively, in the open-seeking servo circuit controls the power switch for the motor so that the motor continues to run until all shafts have arrived at their tuning position and all magnetic clutch circuits have been opened.

Other features and objects of this invention will become apparent to those skilled in the art by referring to the preferred embodiments described in the following specification and shown in the accompanying drawings, in which.

Figure 1:
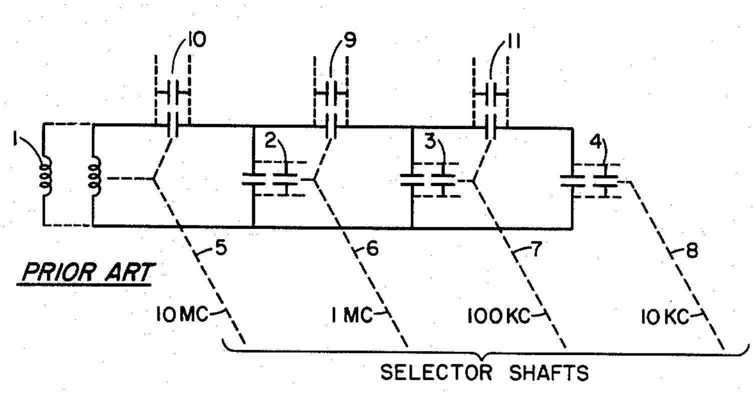
FIG. 1 is a simplified schematic diagram of a resonant circuit of the above-referred patent application which is to be tuned by a plurality of motor-driven shafts according to this invention.

Referring to FIG. 1, it has been found that a resonant tank circuit can be tuned through a wide range of frequencies in small incremental steps. One inductance 1 is connected in parallel with one condenser from each of the groups of tuning condensers 2, 3, and 4. Each group contains ten condensers. Shaft 5 operates switches which will select inductances of different values and adapted to change the resonant frequency of the tank in uniform incremental steps of, say, ten megacycles each. Shaft 6, then, will select one of the ten tuning condensers 2 to modify the resonant frequency in uniform steps of 1 megacycle each. Shafts 7 and 8 likewise modify the resonant frequency of the tank circuit in steps, respectively, of 100 kc. and 10 kc. Where the Q of a particular tank circuit is not high, it is impractical to obtain 1 kc. frequency steps in the circuit tunable in the 10 mc. range. As explained in the application, supra, the 100 kc. condensers of group 3, for example, will cause the same frequency change in the 2 mc. range, say, as in the 20 mc. range. That is, the effective values of the condensers of group 3 are changed by the condensers of group 9, each of which is connected in series with the shunt condensers of group 3. Likewise, the series condensers of group 10 in series with the shunt condensers of group 2 are so chosen as to enable each condenser of group 2 to produce incremental steps of 1 mc. regardless of the frequency range established by the more significant tuning elements of the 10 mc. group. As distinguished from the analog type of tuning circuit, it is merely necessary in tuning the circuits of FIG. 1 to rotate the several tuning shafts 5, 6, 7 and 8 to bring the decimally related information, 0–9, into view on detented selector dials.

Figure 2:
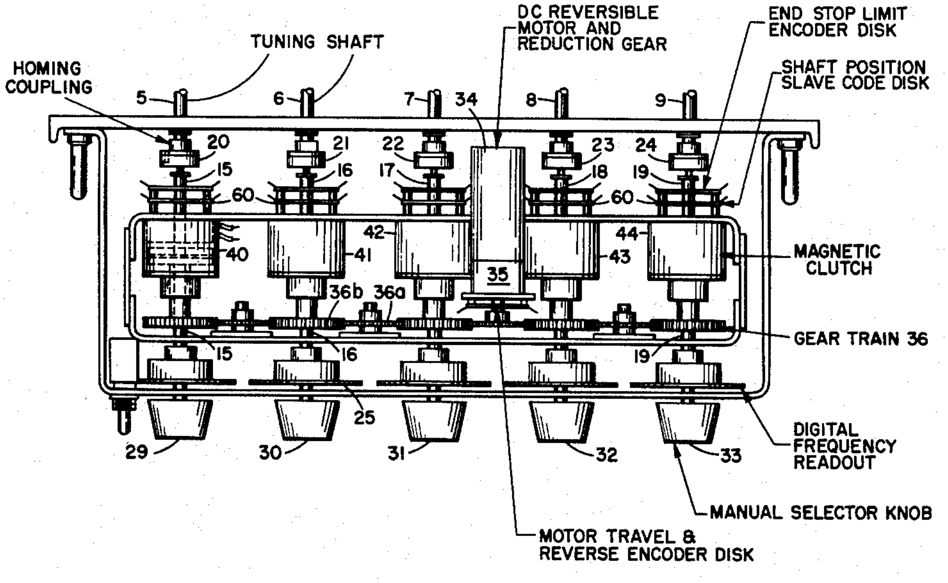
FIG. 2 is a top elevation view of one mechanical layout of the tuning system of this invention.

The top view of the mechanical layout of this invention, shown in FIG. 2, shows shafts 5, 6, 7, 8 and 9 of a radio transmitter or receiver for operating the 10 mc., 1 mc., 100 kc, 10 kc. and 1 kc. switches. For reasons which are not important here, the 1 kc. tuning steps are effected in circuits removed from the tank circuit depicted in FIG. 1. The assembly of FIG. 2 may be clamped to the front panel of the radio transmitting or receiving set after the tuning knobs have been removed from shafts 5, 6, 7, 8 and 9. Each shaft 5, 6, 7, 8 and 9 is aligned with counter shafts 15, 16, 17, 18 and 19 and the end-to-end tuning shafts are coupled through the homing self-aligning couplings 20, 21, 22, 23 and 24. A single eccentric pin and hole in the couplings insure proper rotational indexing of the end-to-end shafts. The counter shafts extend from the homing couplings through the equipment shown and through the front panel of the assembly. To the protruding ends of the counter shafts are attached knobs 29, 30, 31, 32 and 33 for manually adjusting the shafts. On each shaft is mounted and keyed indicating dials 25, each with numbers 0–9 which can be brought into registry with a viewing window in the front panel of the assembly.

Motor 34 is preferably of the direct current type and is incorporated with speed reduction gears in the housing 35. The low speed, relatively high torque, output shaft of the gear box is coupled to the gear train 36. Alternate gears **36*a* of the train idle upon fixed journals attached to the front panel while the remaining gears 36*b* of the train, respectively, rotate freely upon the counter shafts 15, 16, 17, 18 and 19**. With one idle gear between each pair of gears *36b*, the counter shafts all rotate in the same direction. Each shaft-mounted gear is selectively coupled to its associated shaft through a magnetic clutch. The magnetically operated clutches 40, 41, 42, 43 and 44 each comprise two clutch plates which can be brought into frictional engagement by a magnetic circuit. As shown schematically in FIG. 4, the gear *36b* is a part of and drives clutch plate 37, the two rotating freely on shaft 17. The other clutch plate 38 is keyed firmly to the shaft. The two clutch plates 37 and 38 are of iron and can be moved into frictional engagement by the magnetic coil 39 when the coil is energized with a predetermined current. Deenergization of coil 39 permits disengagement of the clutch plates and idling rotation of the gear 36 and plate 37. Detent mechanism, not shown, or shaft friction will hold each shaft in any position to which it may be driven by the motor or by the knobs.

By circuits which will be described below, motor 34 and its gear train will continue to run until all shafts have been driven to the positions dictated by a series of incoming command signals. Information concerning the position of each shaft is derived by wafer-type switches 60, each comprising a series of ten circularly arranged fixed contacts and one wiping contact keyed to the shaft.

Figure 4:
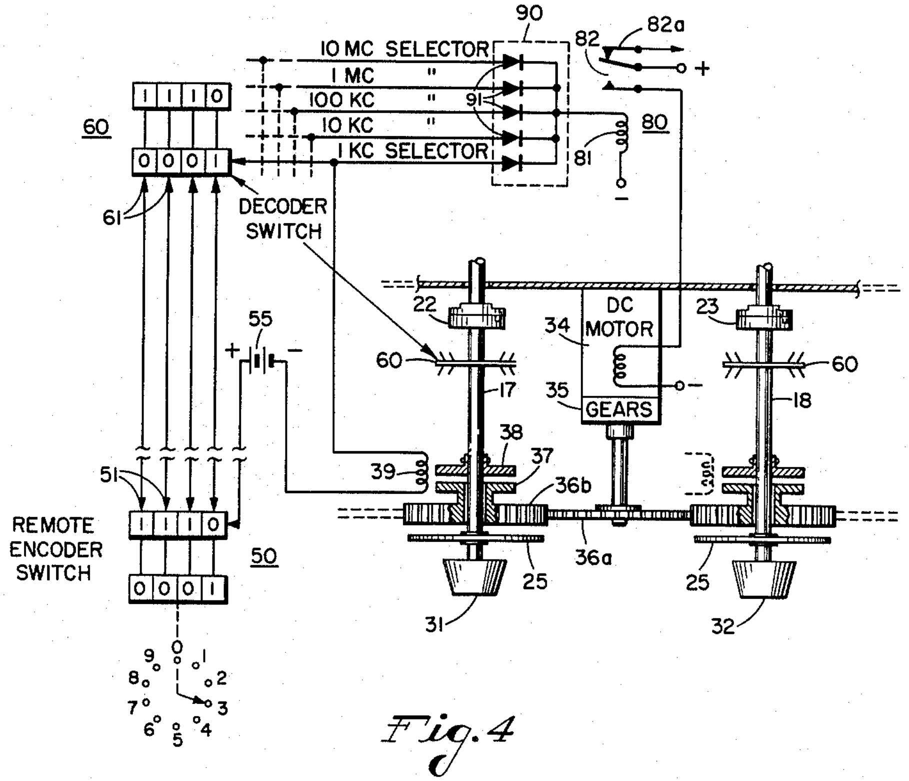
FIG. 4 is a fragmentary view of the tuning shaft drive with a diagram of the relevant circuits.

In FIG. 4 is shown diagrammatically the circuits associated with one tuning shaft, the circuits being duplicated for each of the remaining tuning shafts. Each shaft may be remotely commanded to move to any one of ten positions, numbered 0 to 9. An open-seeking servo circuit is employed between each of the five remote manual selector encoding switches, one of which is shown at 50, and the local slave decoder switch 60. Each open-seeking circuit contemplated here comprises a cable with four information wires and a common ground circuit.

Figure 3:
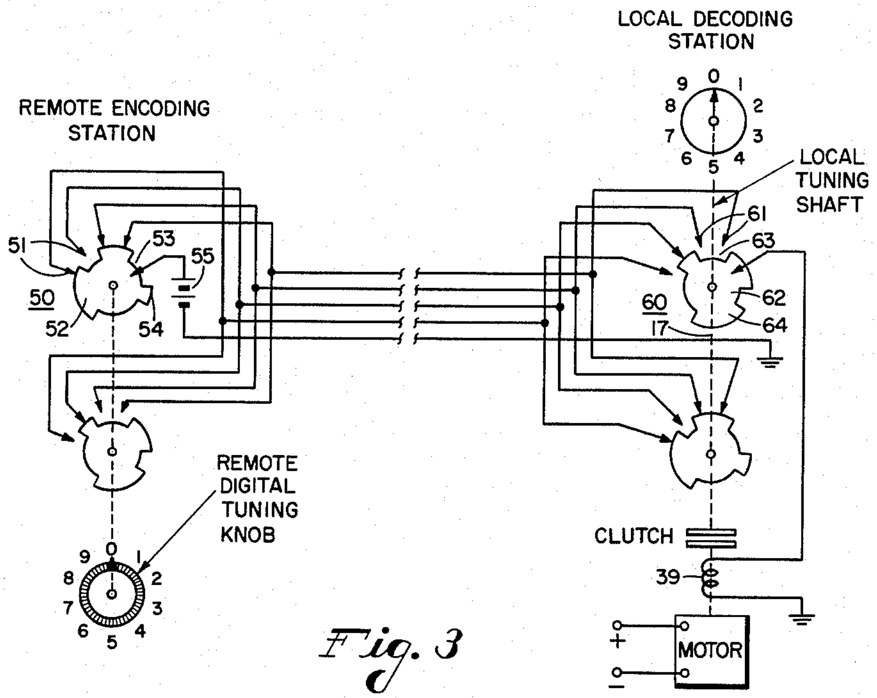
FIG. 3 is a circuit diagram of one open-seeking position servo circuit associated with one tuning shaft.

One specific open-seeking servo circuit found to be satisfactory is shown in detail in FIG. 3. The remote encoding station comprises a wafer of insulating material with a set of four fixed wiping contacts 51 on one face of the wafer and connected to the four information wires. On the shaft extending through the wafer is keyed a metal disc 52 with peripheral open circuit segments 53 and closed circuit segments 54 so selected as to width and distribution as to impress a different four-place binary number, for each of the ten shaft positions, on the fixed contacts and on the four wires of the connecting cable. The common ground circuit includes the battery 55 and a wiper in contact with the disc. At the local decoding station is the slave decoder wafer switch 60 with a set of fixed contacts 61 and a rotary disc 62 segmented at 63 and 64 for open and closed circuits exactly the complement of the discs of the remote station 50. It follows that there is one rotational position of the shaft 17 and its switch member in which the battery circuit through the remote and local wafers is open. Accordingly, when the remote tuning knob is rotated to any new position, the local shaft must be driven until the one open circuit position of the local station is found. On the reverse side of each wafer, at the local and remote stations, is mounted a complementary disc as shown in FIG. 3. The common wiper is not connected to the coding disc. These segments are designed to be complementary to the respective coding disc to ensure the ability to restart from any position to each and every newly reselected position from 0 to 9, inclusive.

The circuit of battery 55, as shown in FIG. 4, includes the common ground line, the four coding wires and the coil 39 of the magnetic clutch. As will appear, the motor 34 normally continues to operate, the tuning shaft being disengaged from the motor drive by deenergization of the coil 39 only when the open-seeking servo circuit opens.

According to this invention, the motor is energized and continues to operate until all tuning shafts have arrived at the positions demanded by all of the remote manual selectors. In FIG. 4, the motor circuit includes relay 80 with coil 81 operating normally open contacts 82. According to an important feature of this invention, coil 81 is energized and the contacts 82 held closed until all open-seeking servo circuits are open circuited. Conventional OR gate 90 comprises five input circuits in the system shown where there are five shafts to be positioned and five servo circuits. The single output circuit is connected in series with winding 81 of the relay. If there is a positive voltage on any one of the input control circuits of the OR gate, current flows through the series diode 91, winding 81 is energized and the motor continues to run. Only when all of the open-seeking circuits are open-circuited will the power relay 80 deenergize and permit the motor to stop. Back contacts *82a* are connected in a signal circuit to indicate to the operator when tuning starts and stops.

Thus far, remote tuning controls have been described for tuning shafts which are free to rotate continuously in one direction. That is, no mechanical or electrical stops are contemplated and a non-reversible motor may be employed. The system of FIG. 4 is satisfactory for manual operation where the operator can directly feed in the desired new tuning information by inspection of the tuning dials. Unfortunately, some tuners cannot be rotated continuously in either direction, but for various mechanical reasons must be provided with stops for positively arresting shaft rotation. Further, continuous rotation is not feasible where the tuning must be accomplished by counting the steps from the old to the new shaft positions, as in the case of automatically programmed tuner settings. Still further, in military applications, it may be necessary, in the absence of light and visible number displays, for the operator to tune by "feel." Without positive stops for informing the operator of shaft position, the shaft position may be lost. A reference starting point for shaft position is desirable.

Figure 5:
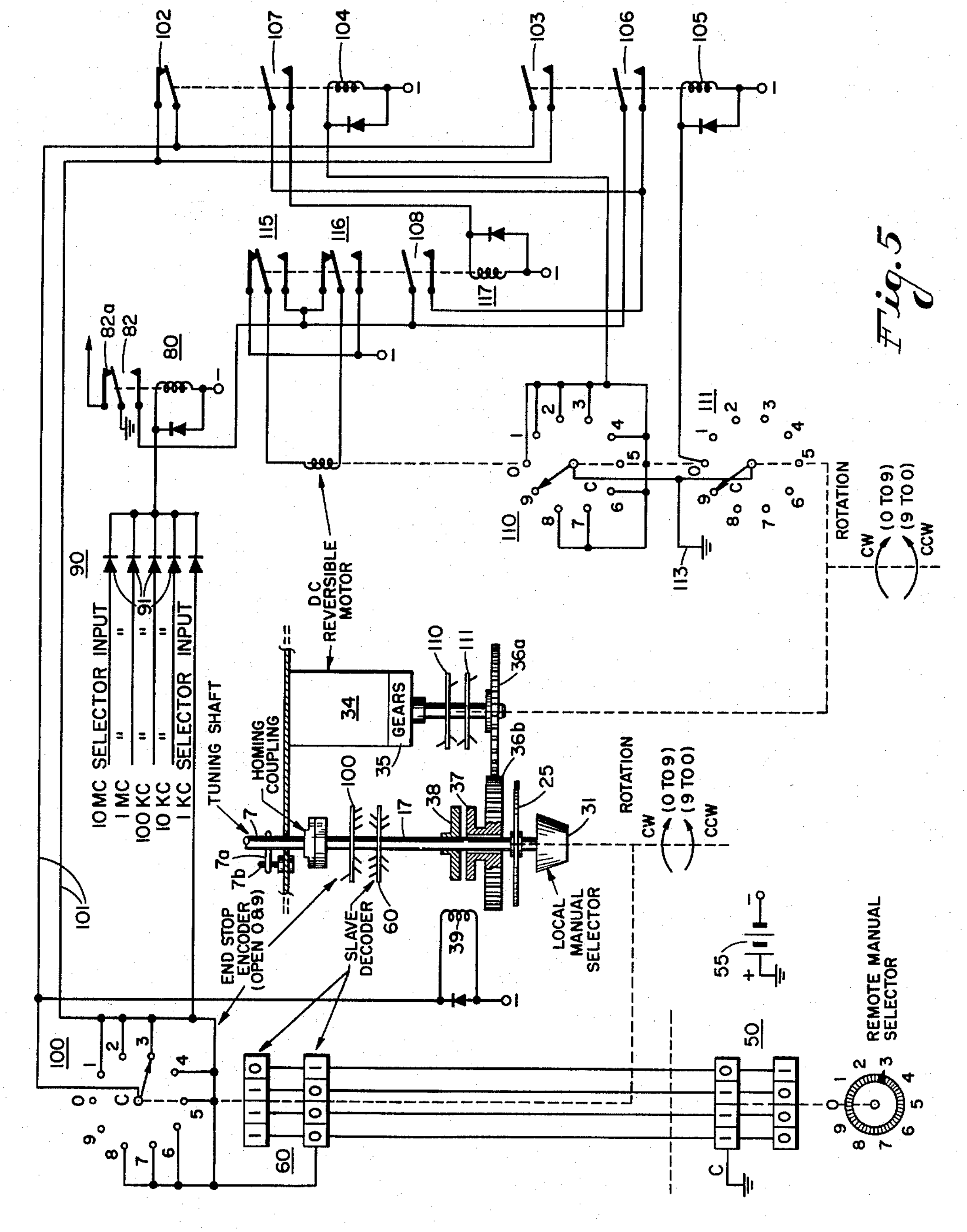
FIG. 5 is a fragmentary view of the tuning shaft drive with a complete diagram of one operative circuit.

FIG. 5 is similar to FIG. 4 but with the logic circuits for permitting remote tuning, the tuning shafts being provided with mechanical stops and the motor and tuning shafts being reversible. The stop mechanism for tuning shaft 7 may comprise the key *7a* which will strike stationary pin *7b* from either side as the tuning shaft enters position 0 or 9. In FIG. 5, a fragmentary view of the driving motor, gear train, and one tuning shaft are shown with a schematic circuit diagram of the controls for that one shaft.

On tuning shaft 17 is mounted the end stop encoder switch 100 which conveniently may comprise a wafer-type switch with a moving contact keyed to the shaft and with stationary contacts connected, as shown schematically in FIG. 5. Since the tuning shaft is mechanically stopped in positions 0 and 9, the clutch must be disengaged as soon as the tuning shaft enters the mechanically stopped positions 0 or 9, else the motor and gear train will be strained or broken. Preferably, end stop encoder switch 100 is provided with contacts which are closed in positions 1 to 8, inclusive, but opens in positions 0 and 9. The wiper of each encoder switch 100 will thus energize and engage the associated clutch 39 in all positions from 1 to 8 and will open in either position 0 or 9. As in FIG. 4, information of each deenergized clutch is fed into one of the control circuits of OR gate 90 to permit deenergization of the driving motor if, of course, all of the tuning shafts are at rest and all of the inputs of the OR gate so indicate. The encoder switch 100 of FIG. 5 is of the make-before-break type so that the moving contact of switch 100 is fully in position 0 or 9 before the magnetic clutch circuit is broken. Further, the make-before-break action assures there will be no interruptions of the magnetic circuit between shaft positions.

Now, with the clutch circuit opened in positions 0 or 9, there must be provided an overriding switch arrangement for permitting energization of the clutch to permit rotation of the tuning shaft out of the 0 and 9 positions. Lines 101, connected across switch 100, are closed by either override contacts 102 or 103. Override contacts 102 are operated by relay winding 104 while override contacts 103 are operated by relay coil 105. Coils 104 and 105 are in turn responsive to position information received from motor position encoding switches 110 and 111 on the motor shaft. In the specific embodiment shown in FIG. 5, the two motor encoding switches 110 and 111, also of the wafer type, have stationary contacts, 0 to 9, and a rotary contact keyed to the motor shaft. Encoding switch 110 produces a distinct signal when the motor shaft arrives at shaft position 9, while encoding switch 111 produces a distinct signal when the motor shaft arrives at shaft position 0. A third encoding switch 112 which produces a distinct signal when the motor shaft is in either position 0 or 9 will be discussed below in connection with FIG. 7. Specifically, the contacts of switch 110 are closed in all positions from 0 to 8, inclusive, opening only at position 9, while the contacts of switch 111 are open in all positions 1 to 9, closing only at position 0. Switches 110 and 111 are of the shorting type in order to prevent relays 104 and 105 from deenergizing between positions and to ensure full travel to final positions. Other switch structures and other electrical codes could be employed, but the arrangement shown is well adapted for the particular logic circuit of the embodiment of FIG. 5.

In FIG. 5, it has been found convenient to have override contacts 102 as the back contacts of the relay so that they are normally closed when the coil is relaxed. That is, the winding 104 deenergizes only in motor shaft position 9, and when deenergized, contacts 102 are permitted to close. Thus, when the motor shaft is in position 9, contacts 102 close overriding the open circuit of the tuning shaft encoder switch 100. This permits energization of the clutch circuit and movement of the tuning shaft out of position 9. When the motor shaft arrives in position 0, encoder switch 111 closes permitting energization of the winding of relay 105 and closure of contacts 103 to override tuning shaft encoder switch 100 and permits energization of the clutch and removal of the associated tuning shaft out of position 0. It can therefore be seen that lines 101 receive an overriding contact closure at each extreme of motor rotation.

In the embodiment of FIG. 5, the motor will normally start rotation in the counterclockwise direction to drive all wafer contacts toward 0, and when the motor arrives at position 0 it must reverse. The motor reversing contacts 115 and 116 normally stand in the position shown to drive the motor in the counterclockwise direction. Only when contacts 115 and 116 are operated by the relay winding 117 will the motor reverse. That is, the motor reversing relay is operated only when the motor arrives in position 0. In the particular motor reversing circuits of FIG. 5, in motor position 0, switch 111 energizes coil 105, closes contacts 106 (switch 110 energizes coil 104 closing contacts 107), and completes the battery circuit through power contacts 82 and through contacts 107 to motor reversing coil 117. Latch contacts 108 parallel contacts 106 and hold the reversing coil 117 throughout the 0 to 9 direction of travel.

Figures 6, 7:
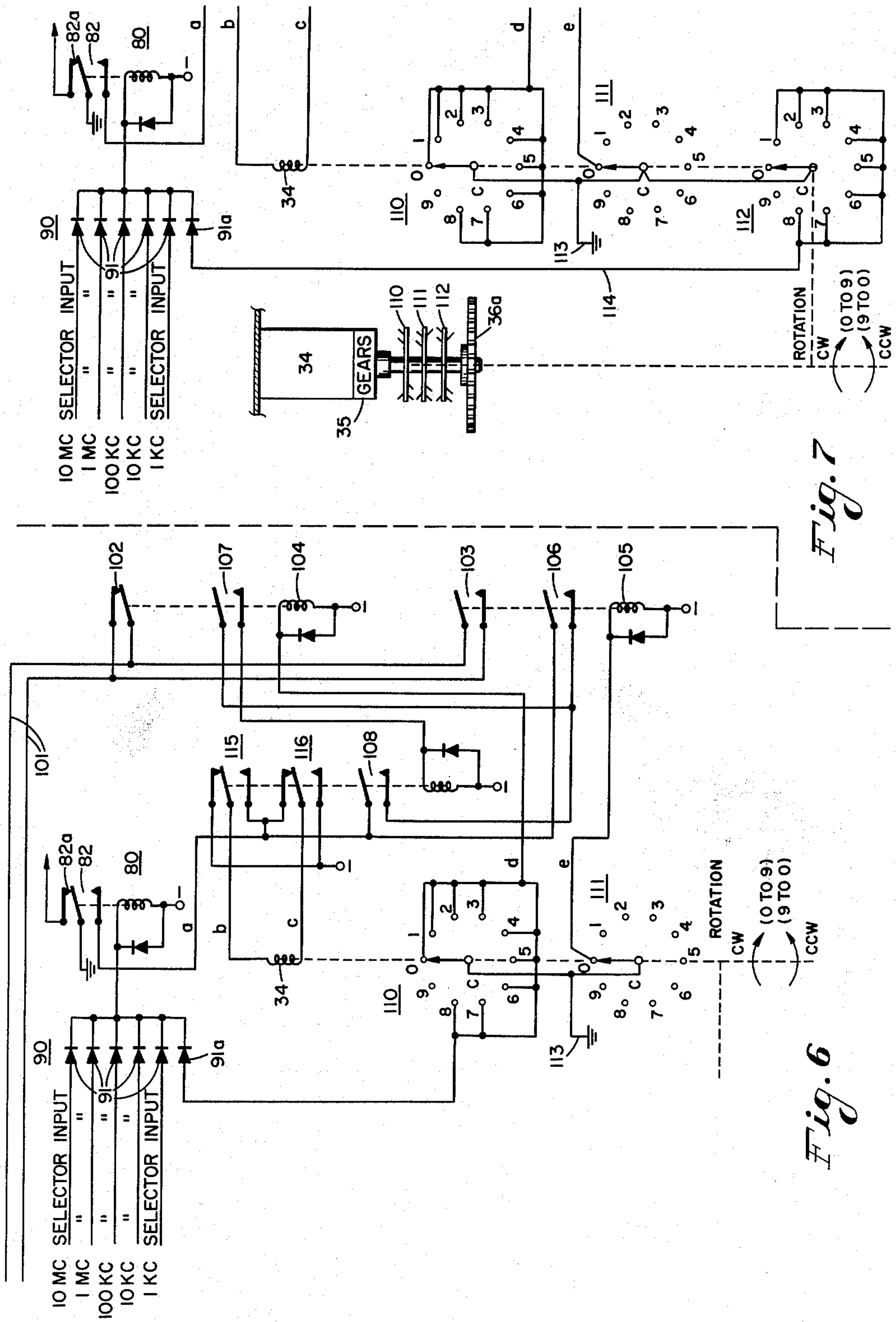
FIGS. 6 and 7 are diagrams of modifications of the operative circuit of FIG. 5.

Referring now to FIG. 6, it has been found desirable, according to another important feature of this invention, to not let the motor stop in any random position at the completion of the tuning operation of the several tuning shafts. As explained above, the OR gate circuit 90 has a number of similarly polarized diodes 91 each in one input circuit, and each connected to one end stop encoder switches 100 carried respectively on the several tuning shafts. According to the further feature of this invention, an additional input circuit including diode *91a* is provided. This input circuit is connected as shown to the fixed contacts of motor position switch 110. Since all positions 0 to 8, inclusive, of switch 110 are connected together, the grounded wiping contact of 110 supplies positive battery voltage to the OR gate input in all motor positions except position 9. This means that even after completion of tuning of each of the several tuning shafts, the motor will continue to position 9 before stopping. Thus the motor shaft is capable of a full scan so that any tuning shaft, regardless of initial position, can be driven to any new position with one round trip of the motor.

Two examples will serve to illustrate the operation of the logic circuits of FIGS. 5 and 6. First, let it be assumed that the tuning shaft stands in position 6 and that the remote selector switch 50 is turned to position 4. The motor stands at position 9. An appropriate code is generated by the remote switch 50 which does not match the code standing on the decoding switch 60. Since the complement of the code of one switch is not present in the other, a battery voltage appears on the decoder common. Plus battery is fed through switch 100 causing the clutch to engage and at the same time plus battery is fed from the common of switch 100 to one input terminal of the OR gate 90. This causes relay 80 to energize, closing power contacts 82 which in turn supplies battery voltage across the motor terminals.

The motor runs counterclockwise which is the direction assumed for the normal position of reversing switch contacts 115 and 116. The tuning shaft is driven by the motor in a counterclockwise direction toward 0 through the engaged clutch and idler gear drive. The shaft rotates from the assumed preset position of 6 to position 5 and to position 4. At this point the code on the decoder switch 60 becomes the full complement of the code generated by switch 50. An open circuit results on the common of switch 60 causing the associated clutch immediately to disengage. At the same time an open appears at the connected input terminal of the OR gate; but the motor continues on to position 0, reverses, and returns to position 9 inasmuch as switch 110 will not permit the power relay circuit, through diode *91a*, to open until the motor returns to position 9.

The second operation example will illustrate the operation of the clutch override switches when the motor must drive the tuning shaft into and out of 0 or 9. Let it be assumed that the tuning shaft is in position 1 and that it is desired to drive the tuning shaft automatically to position 9. Remote selector switch 50, when rotated with respect to slave decoder switch 60, provides a voltage on the decoder switch common. The clutch engages and the motor starts as before driving the motor in the counterclockwise direction. As the motor drives in the counterclockwise direction, the tuner shaft, which is magnetically clutch coupled, moves from the preset position 1 counterclockwise to 0. But, at 0 the end stop switch 100 opens causing the clutch to disengage which again prevents forcing the mechanical stop at the 0 position. The motor, however, continues on to motor position 0 by virtue of the action of diode 91. At position 0, the motor position switch 111 energizes relay winding 105 and closes contacts 106. Since motor position switch 110 kept winding 104 energized and switch contacts 107 closed throughout the 8 to 0 travel, plus battery is now fed through contacts 82, 106 and 107 to relay coil 117. Coil 117 operates the reversing switches 115 and 116. At the same time, coil 117 closes latch contacts 108, shorting contacts 106, and at the same time override switch 103 closes. This permits energization of the clutch coil 39 in the tuning shaft position 0. The clutch engages and runs clockwise with the motor toward the desired position 9. On arriving at position 1 from position 0, contacts 106 open, but latch contacts 108 provide the alternative path for relay winding 117. This permits the continued clockwise rotation of the motor toward position 9.

The motor continues to run toward 9, and at position 9, the desired position required by the remote encoder switch 50, the following sequence of events take place. In position 9, motor position switch 110 opens causing winding 104 to deenergize and permitting winding 117 to deenergize. Thereupon, latch contacts 108 fall out. Decoder switch 60 is now complementary to encoder switch 50 and provides an open circuit at position 9 and the clutch deenergizes. The motor reversing contacts 115 and 116 thereupon revert to their normal position and the motor is ready for normal counterclockwise rotation; but since the open-seeking servo systems 50 and 60 now provide an open circuit in their common, the motor power relay 80 is permitted to fall out through OR gate 90. If the tuning position had been 8 or any other position, diode 91*a* associated with 110 would have kept the motor running until it arrived in position 9.

In the embodiments of FIGS. 4 or 5, the motor stops immediately in any random position in which it may be at the time the last tuning shaft arrives in its new position, while in the embodiment of FIG. 6 the motor returns to position 9. It can be demonstrated as a matter of probabilities that a shorter time for tuning all shafts and stopping the motor will be less if the motor is directed to continue to either the 0 or 9 position after the last tuning shaft operation, and to start the next tuning operation from either motor position 0 or 9. As shown in FIG. 7, the motor positioning switch 112 is added. Like the other switches, switch 112 is preferably of the wafer type with ten stationary contacts and one wiping contact keyed to the motor shaft. Contacts 1 to 8 of switch 112 are connected together and to the input of the OR gate 90. While the motor is in any one of the positions 1 to 8, inclusive, plus battery is applied through ground 113, through the wiping contact and through the fixed contacts 1 to 8 and through lead 114 to diode 91*a* of the OR gate. Such a voltage keeps power relay 80 energized and the motor running in one direction or the other until the motor arrives at either position 0 to 9. In either of these positions the OR gate input 91*a* permits the motor relay to drop out and the motor to stop, assuming, of course, that all tuning shafts have been driven to their new tuning positions. The relay 80 may be reenergized and the motor started thereafter only by new information from remote selector switch 50. Thereupon, the motor starts from position 0 or 9 and completes one end stop-to-end stop sweep of the ten motor positions. Only if all tuning has not been completed in this sweep is a return trip required. That is, the initial sweep plus a possible return sweep is the maximum rotation required.

In the preferred embodiment of this invention, the motor 34 and the reduction gears 35 are so selected as to produce ten revolutions per minute of the gears of the train 36, under full load of all tuning shafts driven. If the distance from end stop-to-end stop is 270 degrees, the maximum round trip time for the motor from end stop-to-end stop and return is less than nine seconds. It will be perceived that the total tuning time for all of the shafts is the same regardless of the number of shafts. The only limitation in the number of shafts would be the power of the motor and the drag of the shafts.

It will also be observed that in case of power failure to the driving motor 34 and the clutches, the radio equipment may nevertheless be operated manually by manipulation of the tuning knobs 29–33. That is, the disengaged clutches add no drag to the shafts and the tuning knobs will override the automatic power driving equipment without difficulty. Likewise, the electrical drive for the tuning shafts may override the manual drive to move the tuning shafts from any manually set position to any new remotely dictated position.

Many modifications may be made in the system of this invention without departing from the scope of the invention nor from the scope of the appended claims. For example, many modifications may be made in the position servo system or in the logic circuitry shown for sensing motor position information, or for stopping and reversing the motor at the stops and for bringing the motor to rest.

What is claimed is:

1. In combination:
(a) a resonant tank circuit, said tank circuit comprising a plurality of groups of reactance elements, a plurality of switch means for selectively coupling one element of each group into said tank circuit, the elements of each group being chosen in value to produce uniform incremental changes in resonant frequency, the incremental changes produced by the elements of each group being decimally related, a shaft operatively connected to each switch means,
(b) a reversible motor,
(c) a magnetic clutch on each shaft driven by said motor to selectably engage and drive the associated shaft in response to energization of the electromagnet of said clutch,
(d) a plurality of open-seeking position servo systems, each system including a remote ten-position encoding switch with a corresponding local slave decoding switch, respectively, on each shaft, the common conductor of each servo system being connected in series with the energization circuit of the associated electromagnet so that each shaft is driven by said motor to one of the ten positions dictated by the manual remote encoding switches,
(e) a power source for driving said motor,
(f) a relay with a power switching circuit for selectively energizing said motor with the power source, and with a control circuit, and
(g) an OR gate, the common conductor of all of said decoding switches being coupled in multiple through said OR gate to the relay control circuit for energizing said motor until all decoding switches have been driven to open-circuit positions.

2. In combination:
(a) a resonant circuit, said resonant circuit comprising a plurality of selectable reactance elements,
(b) a plurality of tuning shafts operatively connected, respectively, to said elements,
(c) a reversible motor,
(d) a magnetic clutch on said shaft driven by said motor to selectably engage and drive said shaft in response to energization of the electromagnet of said clutch,
(e) a plurality of open-seeking servo systems, each open-seeking position servo system including a manual remote encoding switch and a local slave decoding switch interconnected with a plurality of information conductors and a common conductor, the decoding switches being mounted, respectively, on said shafts, the common conductor of each servo being connected in the energization circuit of the associated electromagnet so that said shaft is driven by said motor to the position dictated by said remote encoding switch,
(f) a power switch for said motor,
(g) a reversing switch means connected in circuit with said power switch and said motor,
(h) a motor position encoding switch responsive to motor shaft position, and
(i) circuit means responsive to said position switches for operating said reversing switch means.

3. The combination comprising:
(a) a unitary resonant circuit with a plurality of groups of reactance elements, the elements of the groups being selectably switched into the resonant circuit for changing the resonant frequency of said circuit in decimally-related increments,
(b) a plurality of tuning shafts, each shaft being operatively associated respectively with the switch selecting means of one of said groups of reactance elements, (c) a motor coupled through a direct drive linkage to all of said tuning shafts,
(d) a power relay for said motor,
(e) clutch mechanism for selectively engaging said linkage to and disengaging said linkage from said shafts,
(f) a position servo system for each shaft, each servo system including a remote encoding station and a local decoding station with circuit means for producing a unique voltage when the shaft arrives at the rotational position dictated by the associated remote encoding station,
(g) means responsive to said unique voltage of each servo system for operating the associated clutch mechanism, and
(h) means responsive to a unique combination of said voltages for operating said power relay.

4. In the combination defined in claim 3 the last-mentioned means comprising an OR gate with a plurality of input circuits responsive, respectively, to said unique voltages for producing at the output circuit of said OR gate a control current for operating said power relay.

5. In combination:
(a) a unitary structure having a plurality of separately adjustable shafts,
(b) a single reversible drive motor, each of said plurality of shafts having a clutch mechanism for selectively engaging each shaft with said motor,
(c) an end-stop encoding switch on each shaft for signaling two limits of travel of the shaft,
(d) a power switch and a reversing switch connected between a power source and said reversible motor,
(e) an OR gate with a plurality of input control circuits connected respectively to said end-stop encoder switches and with an output circuit connected to said power relay for interrupting power to said motor only when signals from all of said end-stop encoder switches correspond in value,
(f) motor position encoding switches mounted on said motor shaft, and
(g) logic circuit means responsive to said motor position encoding switches for operating said reversing switch at each of two predetermined limits of travel of said motor.

6. The combination defined in claim 5 further comprising a connection between said motor position encoding switch and one input circuit of said OR gate for keeping said power relay energized until said motor arrives at one predetermined position.

7. In combination:
(a) a unitary structure having a plurality of separately adjustable shafts,
(b) a single motor,
(c) a positive drive linkage between said motor and each of said tuning shafts,
(d) a plurality of magnetically operated clutches separately associated with different ones of said plurality of shafts for selectively engaging said shafts with said drive linkage, each shaft having end stops for limiting the motion thereof,
(e) end stop encoding switches on each of said shafts for signaling either end of the travel of said shafts, said clutches each being responsive to the end of travel signaling of said encoding switch on their respective associated shafts for disengaging said drive linkages from said shafts,
(f) a motor position encoding switch mounted on said motor shaft for producing a distinct signal for signaling motor shaft end positions, and
(g) means responsive to said distinct signal voltage for reversing said motor.

References Cited by the Examiner

UNITED STATES PATENTS

| | | | |
|---|---|---|---|
| 2,398,579 | 4/46 | Clark | 192—142 |
| 2,413,211 | 12/46 | Brian | 192—142 |
| 2,474,663 | 6/49 | Goddard | 192—142 |
| 2,676,289 | 4/54 | Wulfsberg | 192—142 X |
| 2,783,429 | 2/57 | Tauber | 318—467 |
| 2,796,574 | 6/57 | Hatfield | 318—467 |
| 2,808,557 | 10/57 | Smith | 318—467 |
| 3,054,057 | 9/62 | Bettin et al. | 325—383 |

OTHER REFERENCES

Richards: Arithmetic Operations in Digital Computers, page 39, Van Nostrand Co., Inc., New York, copyright 1955.

HERMAN KARL SAALBACH, *Primary Examiner*.